(12) United States Patent
Gray et al.

(10) Patent No.: US 8,494,013 B2
(45) Date of Patent: Jul. 23, 2013

(54) PHOTODARKENING RESISTANT OPTICAL FIBERS AND FIBER LASERS INCORPORATING THE SAME

(75) Inventors: Stuart Gray, Corning, NY (US); Shenping Li, Painted Post, NY (US); Ji Wang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 229 days.

(21) Appl. No.: 12/908,102

(22) Filed: Oct. 20, 2010

(65) Prior Publication Data

US 2012/0069858 A1 Mar. 22, 2012

Related U.S. Application Data

(60) Provisional application No. 61/383,953, filed on Sep. 17, 2010.

(51) Int. Cl.
| | |
|---|---|
| *H01S 3/30* | (2006.01) |
| *C03B 37/075* | (2006.01) |
| *C03B 37/01* | (2006.01) |
| *C03C 13/00* | (2006.01) |
| *G02B 6/00* | (2006.01) |
| *G02B 6/02* | (2006.01) |

(52) U.S. Cl.
USPC .................... 372/6; 65/390; 65/426; 385/123

(58) Field of Classification Search
None
See application file for complete search history.

(56) References Cited

U.S. PATENT DOCUMENTS

| | | | |
|---|---|---|---|
| 4,345,036 A | * | 8/1982 | Bamford et al. ................ 65/390 |
| 5,937,134 A | | 8/1999 | DiGiovanni ................ 385/142 |

(Continued)

FOREIGN PATENT DOCUMENTS

| | | |
|---|---|---|
| EP | 2230221 | 9/2010 |
| WO | WO2007/110081 | 10/2007 |

OTHER PUBLICATIONS

"Characterization of defect luminescence in Yb doped silica fibers: part I NBOHC"; Dragic et al; Optics Express; Mar. 31, 2008; vol. 16, No. 7; p. 4688-4697.

(Continued)

*Primary Examiner* — Armando Rodriguez
*Assistant Examiner* — Sean Hagan
(74) *Attorney, Agent, or Firm* — Svetlana Z. Short (57) ABSTRACT

Photodarkening resistant optical fiber lasing media and fiber lasers incorporating the same are disclosed. In one embodiment, an optical fiber lasing medium includes a core portion formed from silica-based glass comprising a rare-earth dopant and deuterium, the core portion having an index of refraction $n_c$, a numerical aperture $NA_c$. A concentration of defect color centers in the core portion is less than $1\times10^{16}/cm^3$. Deuterium is combined with the defect color centers to form reacted defect color centers that do not absorb ultraviolet and visible wavelengths of light. A first cladding portion is formed from silica-based glass, the first cladding portion surrounding and directly contacting the core portion and having an index of refraction $n_1$, wherein the index of refraction $n_1$ of the first cladding portion is less than the index of refraction $n_c$ of the core portion. Methods of forming the photodarkening resistant optical fiber lasing media are also disclosed.

20 Claims, 6 Drawing Sheets

U.S. PATENT DOCUMENTS

| | | | |
|---|---|---|---|
| 6,499,318 B1 * | 12/2002 | Lemaire et al. | 65/390 |
| 6,587,625 B1 | 7/2003 | Abate et al. | 385/123 |
| 7,277,616 B2 | 10/2007 | Ishikawa et al. | 385/115 |
| 7,527,919 B2 | 5/2009 | Sakamoto et al. | 430/321 |
| 7,900,481 B2 | 3/2011 | Gallagher et al. | |
| 8,000,575 B2 | 8/2011 | Chen et al. | |
| 2002/0102083 A1 | 8/2002 | Berkey et al. | |
| 2002/0154874 A1 | 10/2002 | Ahrens et al. | 385/123 |
| 2008/0080823 A1 | 4/2008 | Gray et al. | |
| 2008/0131794 A1 * | 6/2008 | Bookbinder et al. | 385/123 |
| 2008/0190146 A1 | 8/2008 | Ishikawa et al. | 65/397 |

OTHER PUBLICATIONS

"Chemical annealing of the aluminium-oxygen hole center in vitreous silica"; Shelby; Journal of Applied Physics 60(12) Dec. 15, 1986; p. 4325-4327.

"Double clad fibers for fiber lasers and amplifiers by OVD"; Ji Wang, Corning Incorporated, Corning, NY 14831 USA.

"Drawing-enhanced defect precursors in low-OH content, oxygen-deficient synthetic silica optical fibers"; Kannan et al; Applied Physics Letters 64(16), Apr. 18, 1994; p. 2090-2092.

"Influence of stoichiometry on high temperature intrinsic defects in fused silica"; Silin et al; Journal of Non-Crystalline Solids 149 (1992) 54-61.

"Optically active oxygen-deficiency-related centers in amorphous silicon dioxide" l Linards Skuja; Journal of Non-Crystalline Solids 239 (1998) 16-48.

"Photo darkening of ytterbium cw fiber lasers"; Mattsson et al; Proceedings of SPIE Vo. (7195) 7195OV-1-7195OV-9.

"Photoinduced reactions of oxygen-deficient centers with molecular hydrogren in silica glasses"; Radzig et al; Journal of Physics Chemistry 1995, 99, 6640-6647.

"The role of charge transfer processes for the induced optical losses in ytterbium doped fiber lasers"; Engholm et al; Proceedings of SPIE vol. 7195 (7195OT-1-7195OT-9).

"Theory of defects in vitreous silicon dioxide"; Eoin O'Reilly; Physical Review B; vol. 27, No. 6, Mar. 15, 1983.

Stone, J.; "Interactions of Hydrogen and Deuterium with Silica Optical Fibers: A Review"; Journal of Lightwave Technology, vol. Lt-5, No. 5, May 1987.

* cited by examiner

PHOTODARKENING RESISTANT OPTICAL FIBERS AND FIBER LASERS INCORPORATING THE SAME

CROSS REFERENCE TO RELATED APPLICATIONS

The present specification claims priority to U.S. Provisional Application No. 61/383,953 filed Sep. 17, 2010 and entitled "Photodarkening Resistant Optical Fibers and Fiber Lasers Incorporating the Same", the entirety of which is incorporated by reference herein.

BACKGROUND

1. Field

The present specification generally relates to optical fibers used as fiber lasing media and, more specifically, to photodarkening resistant optical fibers and methods for making the same.

2. Technical Background

Optical fibers doped with active rare-earth dopants, such as ytterbium and the like, are commonly employed in fiber laser systems. Fiber laser systems employing such fibers are commonly utilized in applications where a laser is needed with both high brightness and high output power. However, one drawback of fiber laser systems is the photo-darkening of the active gain medium in high power fiber lasers.

More specifically, photodarkening occurs in ytterbium-doped optical fibers used as the active gain media in fiber laser systems, particularly after the pump laser of the fiber laser system has been operated at high pump powers which exceed a certain power-intensity threshold. Photodarkening is manifested as a measurable loss in the optical output power of the active gain media during lasing. With continued operation of the fiber laser system, photodarkening results in the progressive loss of optical output power which damages the optical fiber and, in extreme cases, causes the lasing or gain action of the fiber to terminate As such, photodarkening impacts both the reliability and safety of devices which incorporate fiber laser systems utilizing rare-earth doped optical fibers, such as ytterbium-doped optical fibers.

Accordingly, a need exists for alternative optical fibers for use in fiber lasing systems and methods for producing the same.

SUMMARY

According to one embodiment, an optical fiber lasing medium includes a core portion formed from silica-based glass comprising a rare-earth dopant and deuterium, the core portion having an index of refraction $n_c$, and a numerical aperture $NA_c$. A concentration of defect color centers in the core portion is less than $1\times10^{16}/cm^3$. Deuterium is combined with the defect color centers to form reacted defect color centers that do not absorb ultraviolet and visible wavelengths of light. A first cladding portion is formed from silica-based glass, the first cladding portion surrounding and directly contacting the core portion and having an index of refraction $n_1$, wherein the index of refraction $n_1$ of the first cladding portion is less than the index of refraction $n_c$ of the core portion.

In another embodiment, a fiber laser system includes a pump laser and an optical fiber lasing medium optically coupled to the pump laser. The optical fiber lasing medium comprises a core portion formed from silica-based glass that includes a rare-earth dopant and deuterium. The core portion having an index of refraction $n_c$, a numerical aperture $NA_c$, and a concentration of defect color centers of less than $1\times10^{16}/cm^3$. The deuterium in the core portion is combined with the defect color centers to form reacted defect color centers that do not absorb ultraviolet and visible wavelengths of light. The optical fiber lasing medium also includes a first cladding portion which is formed from silica-based glass. The first cladding portion surrounds and directly contacts the core portion and has an index of refraction $n_1$, which is less than the index of refraction $n_c$ of the core portion. In at least one embodiment of the fiber laser system, a containment chamber positioned around and spaced apart from at least a portion of the first cladding portion. The fiber lasing medium is sealed in the containment chamber and the containment chamber is filled with a gaseous atmosphere comprising deuterium.

In yet another embodiment, a method for making an optical fiber lasing medium includes forming a core preform portion of an optical fiber preform such that the core preform portion comprises an active rare earth dopant. A first cladding preform portion of an optical fiber preform is formed around and in direct contact with the core preform portion. The optical fiber preform is consolidated the optical fiber preform such that optical fiber drawn from the optical fiber preform has a concentration of defect color centers of less than $1\times10^{16}/cm^3$. The optical fiber preform is then drawn into optical fiber which is positioned in a soaking chamber having a gaseous atmosphere comprising helium and deuterium gas. The deuterium gas reacts with the defect color centers in a core portion of the optical fiber to form reacted defect color centers that do not absorb ultraviolet and visible wavelengths of light.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
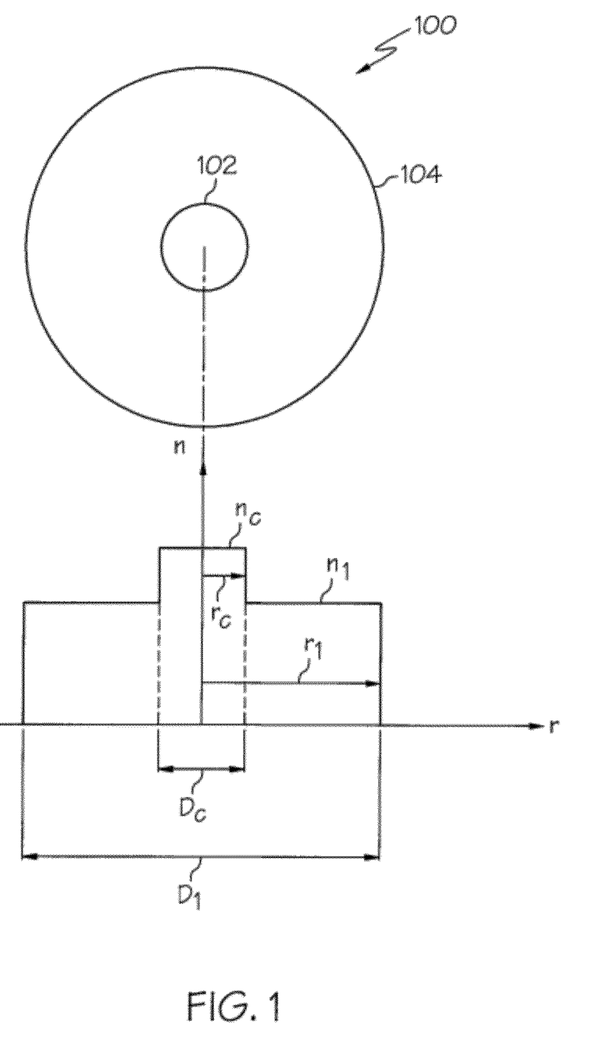
FIG. 1 schematically depicts a cross section of a single clad optical fiber lasing medium and the corresponding refractive index profile, according to one or more embodiments shown and described herein.

Reference will now be made in detail to embodiments of photodarkening resistant optical fiber lasing media, examples of which are illustrated in the accompanying drawings. Whenever possible, the same reference numerals will be used throughout the drawings to refer to the same or like parts. Referring to FIG. 1, the optical fiber lasing media described herein generally comprise a core portion, a first cladding portion, and, in some embodiments, a second cladding portion. The core portion may comprise silica-based glass having a concentration of defect color centers of less than $1\times10^{16}/cm^3$. The core portion may also comprise deuterium. The deuterium is combined with the defect color centers to form reacted defect color centers that do not absorb ultraviolet and visible wavelengths of light which, in turn, mitigates the loss of optical power of the optical fiber lasing media due to photodarkening. The structure, composition, methods of manufacture, characteristics and devices utilizing the fiber lasing media will be described in more detail herein with reference to the appended figures.

Referring now to FIG. 1, a cross section of one embodiment of an optical fiber lasing medium 100 and the corresponding refractive index profile are depicted. In this embodiment the optical fiber lasing medium 100 is a single-clad optical fiber comprising a core portion 102 with an index of refraction $n_c$ and a first cladding portion 104 with an index of refraction $n_1$ where $n_c > n_1$. The first cladding portion 104 surrounds and directly contacts the core portion 102. In the embodiment shown, the core portion 102 and the first cladding portion 104 generally comprise silica, specifically silica-based glass. In the embodiments shown in FIG. 1, the cross section of the optical fiber lasing medium 100 is generally circular-symmetric with respect to the center of the core. However, it should be understood that the optical fibers and individual layers of the optical fiber (e.g., the core portion and the first cladding portion) may have other geometrical configurations.

For example, in one embodiment (not shown) the core portion of the optical fiber may be elliptical in cross section with a major axis and a minor axis. In embodiments having an elliptical core portion, the aspect ratio (i.e., the ratio of the major axis to the minor axis) of the core portion may be at least 1.5:1 and, more preferably from about 2:1 to about 10:1, to improve the birefringence of the core. Further, the first cladding portion of the optical fiber may also be non-circular. For example, in some embodiments (not shown), the first cladding portion of the optical fiber may be hexagonal rather than circular. However, it should be understood that first cladding portions with other geometrical configurations may also be used. Moreover, it should be understood that various combinations of core and cladding geometries may be utilized in the optical fiber lasing media described herein.

In the embodiment of the optical fiber lasing medium 100 shown in FIG. 1, the optical fiber lasing media is designed such that a pump beam of a pump laser can be directly coupled into the core portion 102 such that the core portion 102 acts as a laser gain medium. In this embodiment, the core portion 102 generally has a diameter $D_c$ (i.e., $2r_c$ in FIG. 1) in a range from about 3 microns to about 15 microns while the first cladding portion has a maximum diameter $D_1$ (i.e., $2r_1$ in FIG. 1) in a range from about 100 µm to about 250 µm.

In the embodiment shown in FIG. 1, the core portion 102 comprises silica-based glass doped with a rare earth dopant which enables a lasing action within the core portion 102. In the embodiment shown in FIG. 1, the core portion 102 is doped with Yb, but other rare earth materials may be utilized as dopants in the core portion, including, without limitation, Er, Nd, Tm, Tb, Sm, Gd, Pr. In the embodiments described herein, the rare earth dopant is present in the core portion in amount from about 0.05 wt % to about 2.5 wt %, more preferably from about 0.05 wt. % to about 2.0 wt. % and, even more preferably, from about 0.05 wt. % to about 1.5 wt. %.

In some embodiments, the rare-earth dopants may be co-doped in the core portion 102 with additional dopants, such as Al, B, and F, which act as de-clustering agents for the rare-earth dopants. For example, in some embodiments, aluminum may be added to the core portion 102 as a de-clustering agent. In embodiments where the rare earth dopant is Yb, as described above, the ratio of Al to Yb (i.e., Al:Yb) in the core portion may be from about 3:1 to about 10:1. In the embodiments described herein, the core portion 102 of the optical fiber lasing media 100 comprises from about 3 wt. % Al to about 10 wt. % Al. However, it should be understand that other amounts of aluminum may be added to the core portion.

In the embodiments described herein, phosphorous may be added to the core portion 102 in order to lower the softening temperature of the core glass as well as to increase the index of refraction of the core portion 102. In embodiments where phosphorous is used in the core portion 102, the core portion may contain up to about 10 wt. % or more of phosphorous. Accordingly, it should be understood that the amount of phosphorous in the core may be from about 0 wt. % to about 10 wt. %.

In some embodiments, the core portion 102 may further comprise a dopant which increases the index of refraction of the core portion. The dopant may include, without limitation, Al, Ge, Y, La, Sb or P. For example, in some embodiments, the index raising dopant is Ge which is doped in the core portion as germanium oxide ($GeO_2$). In the embodiments described herein, the core portion is doped with $GeO_2$ in an amount from about 0 wt. % up to about 10 wt. %.

The core portion 102 is formed such that the core portion 102 has a low concentration of defect color centers. Forming the core portion to have a low concentration of defect color centers mitigates the effects of photodarkening which, in turn, improves the reliability and usable life of the optical fiber lasing medium 100. In the embodiments described herein, core portion 102 of the optical fiber lasing medium 100 is formed such that the core portion 102 has a concentration of defect color centers of less than about $1\times10^{16}/cm^3$. Defect color centers absorb ultraviolet and visible wavelengths of light which, in turn, contributes to photodarkening of the optical fiber lasing medium 100. Accordingly, reducing the number of defect color centers decreases the overall absorption of visible and ultraviolet wavelengths of light in the core portions and mitigates photodarkening.

To further mitigate the effects of photodarkening, the core portion 102 of the optical fiber lasing medium also comprises deuterium. In the embodiments described herein, the deuterium in the core portion combines with the defect color centers to form reacted defect color centers which have absorption wavelengths greater than un-reacted defect color centers. The deuterium in the core portion is combined with the defect color centers to form reacted defect color centers which do not absorb ultraviolet and visible wavelengths of light. In the embodiments described herein, the reacted defect color centers in the core portion absorb wavelengths of light greater than about 1250 nm. In order to facilitate formation of a sufficient number of reacted defect color centers, the concentration of deuterium in the core portion is greater than the concentration of defect color centers in the core portion. For example, in one embodiment, the concentration of deuterium in the core portion is at least about $1 \times 10^{18}$ molecules/cm$^3$.

Still referring to FIG. 1, the first cladding portion 104 is generally formed from silica-based glass. In some embodiments, the first cladding portion 104 may be formed from substantially pure silica-based glass, such as when the concentration of dopants and/or contaminants in the glass is low such that the index of refraction $n_1$ of the first cladding portion is similar to that of silica. In some embodiments the silica-based glass of the first cladding portion 104 may comprise a dopant which increases the index of refraction. The dopant may include, without limitation, Al, Ge, Y, La, Sb or P. Where the first cladding portion 104 includes an index-increasing dopant, the index-increasing dopant is present in the first cladding portion 104 such that the index of refraction $n_c$ of the core portion is greater than the index of refraction of the first cladding portion $n_1$. In the embodiments described herein, the amount of GeO$_2$ in the first cladding portion may be less than about 5 wt. %, preferably from about 0 wt. % to about 5 wt. %.

The numerical aperture NA of the core portion characterizes the range of angles over which the core may accept or emit an optical signal and is directly related to the refractive indices of the core portion 102 and the first cladding portion 104. As used herein, the numerical aperture of the core portion $NA_c$ is expressed as:

$$NA_c = \sqrt{(n_c^2 - n_1^2)}$$

for a core portion having an index of refraction $n_c$ and a first cladding portion having an index of refraction $n_1$. Unless otherwise stated, any reference to the numerical aperture of the core portion or $NA_c$ refers to the numerical aperture of the core portion as determined by the above referenced mathematical relation. In embodiments shown and described herein, the compositions of the core portion 102 and the first cladding portion 104 may be selected such that the numerical aperture of the core portion 102 is preferably less than about 0.4.

Figure 2:
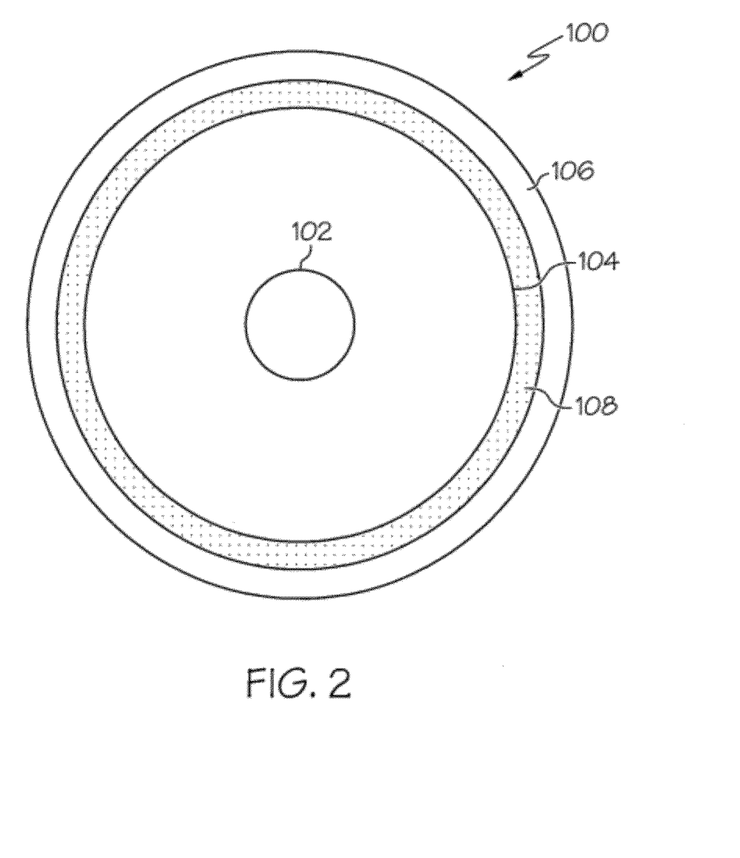
FIG. 2 schematically depicts a cross section of a single clad optical fiber lasing medium which further comprises a containment chamber filled with deuterium gas, according to one or more embodiments shown and described herein.

Referring now to FIG. 2, in one embodiment, the optical fiber lasing medium 100 may further comprise a containment chamber 106 positioned around and spaced apart from at least a portion of the first cladding portion 104. In the embodiments described herein, at least a portion of the core portion 102 and the first cladding portion 104 are hermetically sealed in the containment chamber and the containment chamber is filled with a gaseous atmosphere which includes deuterium gas 108. Filling the chamber with deuterium gas stabilizes the concentration of deuterium in the core portion 102 of the optical fiber lasing medium as the operating temperature of the optical fiber lasing medium fluctuates. One or more ends of the fiber may extend through the walls of the containment chamber to facilitate optically coupling the fiber to other components (e.g., pump lasers, fiber amplifiers and the like). In the embodiments described herein, the containment chamber is formed from a material which is resistant to the diffusion of deuterium gas, including, without limitation, metals, glass, ceramics, composites and/or polymers.

Figure 3:
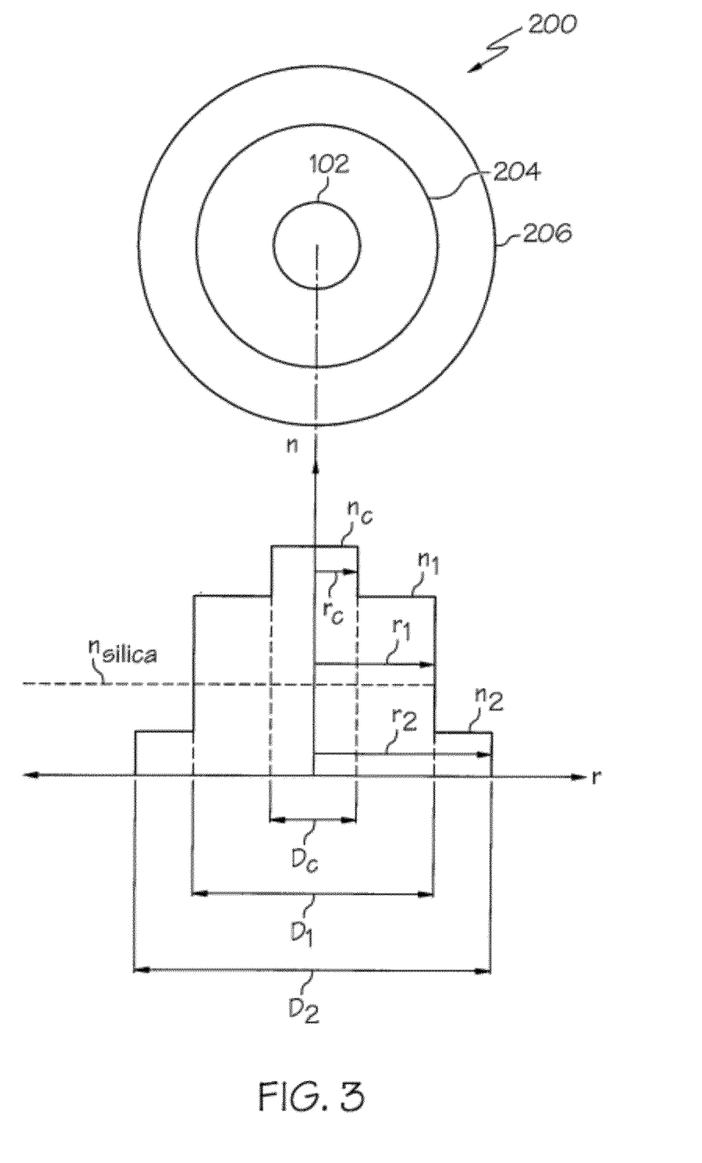
FIG. 3 schematically depicts a cross section of a double clad optical fiber lasing medium and the corresponding refractive index profile, according to one or more embodiments shown and described herein.

Referring now to FIG. 3, a cross section of another embodiment of an optical fiber lasing medium 200 is depicted in which the optical fiber lasing medium is a double-clad optical fiber. The refractive index profile for the fiber lasing medium is also depicted. In this embodiment, the optical fiber lasing medium 200 comprises a core portion 202 with an index of refraction $n_c$, a first cladding portion 204 with an index of refraction $n_1$, and a second cladding portion 206 with an index of refraction $n_2$, where $n_c > n_1 > n_2$. The first cladding portion 204 surrounds and directly contacts the core portion 202 and the second cladding portion 206 surrounds and directly contacts the first cladding portion 204. The core portion 202, the first cladding portion 204 and the second cladding portion 206 generally comprise silica, specifically silica-based glass. In the embodiments shown in FIG. 3, the cross section of the optical fiber lasing medium 200 is generally circular-symmetric with respect to the center of the core. However, it should be understood that the optical fibers and individual layers of the optical fiber (e.g., the core portion, the first cladding portion, and the second cladding portion) may have other geometrical configurations, as described herein above with reference to the single-clad optical fiber lasing medium.

In the embodiment of the optical fiber lasing medium 200 shown in FIG. 3, the optical fiber lasing media is designed such that a pump beam of a pump laser can be directly coupled into the first cladding portion 204 which acts as a multi-mode pumping core. In this embodiment, the core portion 202 may be either single mode or multi-mode at the core lasing wavelength. The first cladding portion 204 serves as a waveguide with a high numerical aperture to facilitate receiving the pump beam of a pump laser. In the embodiments of the double-clad optical fiber lasing media described herein, the core portion 202 has a diameter $D_c$ (i.e., $2r_c$ in FIG. 3) in a range from about 10 microns to about 50 microns while the first cladding portion 204 has a maximum diameter $D_1$ (i.e., $2r_1$ in FIG. 3) in a range from about 200 µm to about 850 µm. The second cladding portion 206 may have a maximum diameter $D_2$ (i.e., $2r_2$ in FIG. 3) in a range from about 300 microns to about 1000 microns.

In the embodiment of the double-clad optical fiber lasing media described herein, the core portion 202 comprises silica-based glass doped with a rare earth dopant which enables a lasing action within the core portion 202. In the embodiment shown in FIG. 3, the core portion 202 is doped with Yb, but other rare earth materials may be utilized as dopants in the core portion, including, without limitation, Er, Nd, Tm, Tb, Sm, Gd, Pr. In the embodiments described herein, the rare earth dopant is present in the core portion in an amount from about 0.05 wt % to about 2.5 wt %, more preferably from about 0.05 wt. % to about 2.0 wt. % and, even more preferably, from about 0.05 wt. % to about 1.5 wt. %.

In some embodiments, the rare-earth dopants may be co-doped in the core portion 202 with additional dopants, such as Al, B, and F, which act as de-clustering agents for the rare-earth dopants. For example, in some embodiments, aluminum may be added to the core portion 202 as a de-clustering agent. In embodiments where the rare earth dopant is Yb, as described above, the ratio of Al to Yb (i.e., Al:Yb) in the core portion may be from about 3:1 to about 10:1. In the embodiments described herein, the core portion 202 of optical fiber lasing media comprises from about 3 wt. % Al to about 10 wt. % Al. However, it should be understand that other amounts of aluminum may be added to the core portion.

In the embodiments described herein, phosphorous may be added to the core portion 202 in order to lower the softening temperature of the core glass as well as to increase the index of refraction of the core portion 202. In embodiments where phosphorous is used in the core portion 202, the core portion may contain up to about 10 wt. % or more of phosphorous. Accordingly, it should be understood that the amount of phosphorous in the core portion may be from about 0 wt. % to about 10 wt. %.

In some embodiments, the core portion 202 may further comprise a dopant which increases the index of refraction of the core portion. The dopant may include, without limitation, Al, Ge, Y, La, Sb or P. For example, in some embodiments, the index raising dopant is Ge which is doped in the core portion as germanium oxide ($GeO_2$). In the embodiments described herein, the core portion is doped with $GeO_2$ in an amount from about 0 wt. % up to about 10 wt. %.

In the embodiments described herein, the core portion 202 is formed such that the core portion 202 has a low concentration of defect color centers, as described above. Forming the core portion to have a low concentration of defect color centers mitigates the effects of photodarkening which, in turn, improves the reliability and usable life of the optical fiber lasing medium 200. In the embodiments described herein, core portion 202 of the optical fiber lasing medium 200 is formed such that the core portion 202 has a concentration of defect color centers of less than about $1\times10^{16}/cm^3$. Defect color centers absorb ultraviolet and visible wavelengths of light which, in turn, contributes to photodarkening of the optical fiber lasing medium 200. Accordingly, reducing the number of defect color centers decreases the overall of absorption of visible and ultraviolet wavelengths of light in the core portions and mitigates photodarkening.

To further mitigate the effects of photodarkening, the core portion 202 of the optical fiber lasing medium also comprises deuterium. In the embodiments described herein, the deuterium in the core portion combines with the defect color centers to form reacted defect color centers which have absorption wavelengths greater than un-reacted defect color centers. The deuterium in the core portion is combined with the defect color centers to form reacted defect color centers which do not absorb ultraviolet and visible wavelengths of light. In the embodiments described herein, the reacted defect color centers in the core portion absorb wavelengths of light greater than about 1250 nm. In order to facilitate formation of a sufficient number of reacted defect color centers, the concentration of deuterium in the core portion is greater than the concentration of defect color centers in the core portion. In the embodiments described herein, the concentration of deuterium in the core portion is at least about $1\times10^{18}$ molecules/$cm^3$.

Still referring to FIG. 3, the first cladding portion 204 is generally formed from silica-based glass. In the embodiments described herein, the silica-based glass of the first cladding portion 204 comprises a dopant which increases the index of refraction of the first cladding portion to greater than that of substantially pure silica ($n_{silica}$), as shown in the index of refraction profile of FIG. 3. The dopant may include, without limitation, Al, Ge, Y, La, Sb or P. The amount of index-increasing dopant in the first cladding portion 204 is selected such that the index of refraction $n_c$ of the core portion is greater than the index of refraction of the first cladding portion $n_1$. In the embodiments of the double-clad optical fiber lasing medium described herein, the amount of $GeO_2$ in the first cladding portion may be greater than about 5 wt. %, preferably from about 5 wt. % to about 12 wt. %.

The numerical aperture $NA_c$ of the core portion 202 characterizes the range of angles over which the core may accept or emit an optical signal and is directly related to the refractive indices of the core portion 202 and the first cladding portion 204. As used herein, the numerical aperture of the core portion $NA_c$ is expressed as:

$$NA_c=\sqrt{(n_c^2-n_1^2)}$$

for a core portion having an index of refraction $n_c$ and an first cladding portion having an index of refraction $n_1$. Unless otherwise stated, any reference to the numerical aperture of the core portion or $NA_c$ refers to the numerical aperture of the core portion as determined by the above referenced mathematical relation. In embodiments of the double-clad optical fiber lasing medium shown and described herein, the compositions of the core portion 202 and the first cladding portion 204 are such that the numerical aperture of the core portion 202 is preferably less than about 0.08. For example, in one embodiment, the numerical aperture $NA_c$ of the core portion is from about 0.04 to about 0.08.

The double-clad optical fiber lasing medium 200 described herein, the optical fiber lasing medium further comprises a second cladding portion 206 which surrounds and directly contacts the first cladding portion 204. In one embodiment, the second cladding portion 206 is formed from silica-based glass. In another embodiment, the second cladding portion is formed with silica-based glass which is down-doped with one or more dopants which decreases the index of refraction of the second cladding portion including, without limitation, B, F or combinations of B and F. When boron is used as a dopant, the boron may be incorporated into the silica-based glass as $B_2O_3$. In one embodiment, the second cladding portion 206 is down-doped with a combination of B and F. In this embodiment, the amount of B in the second cladding portion is from about 5 wt. % to about 9 wt. % and the amount of fluorine in the second cladding portion is from about 1.5 wt. % to about 3 wt. %.

While the second cladding portion has been described herein as being formed from silica-based glass, it should be understood that, in other embodiments (not shown), the second cladding portion may be formed from a polymeric material having the desired index of refraction.

The numerical aperture $NA_1$ of the first cladding portion characterizes the range of angles over which the first cladding portion accepts or emits an optical signal and depends on the mathematical relationship between refractive indices of the first cladding portion and the second cladding portion. According to one embodiment, the numerical aperture of the first cladding portion $NA_1$ may be calculated using the relationship:

$$NA_1=\sqrt{(n_1^2-n_2^2)},$$

where $n_1$ is the index of refraction of the first cladding portion and $n_2$ is the index of refraction of the second cladding portion. In the embodiments described herein, the compositions of the first cladding portion 204 and the second cladding portion 206 are such that the difference in the refractive indices produces a first cladding portion 204 having the desired numerical aperture. The numerical aperture $NA_1$ of the first cladding portion is at least 0.3 such that the range of angles over which the first cladding portion 204 accepts or emits an optical signal is maximized.

Figure 4:
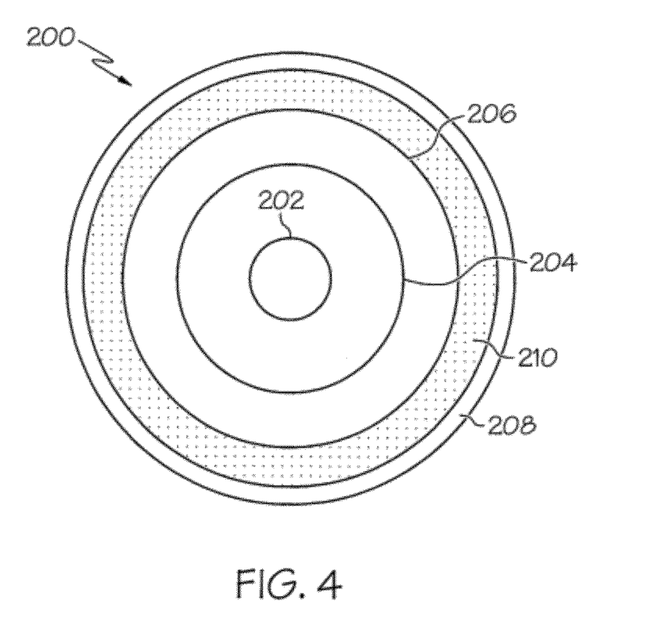
FIG. 4 schematically depicts a cross section of a double clad optical fiber lasing medium which further comprises a containment chamber filled with deuterium gas, according to one or more embodiments shown and described herein.

Referring now to FIG. 4, in one embodiment, the optical fiber lasing medium 200 may further comprise a containment chamber 208 positioned around and spaced apart from at least a portion of second cladding portion 206. In the embodiments described herein, at least a portion of the core portion 202, first cladding portion 204, and second cladding portion 206 are hermetically sealed in the containment chamber and the containment chamber is filled with a gaseous atmosphere which includes deuterium gas 210. Filling the chamber with deuterium gas stabilizes the concentration of deuterium in the core portion of the optical fiber lasing medium as the operating temperature of the optical fiber lasing medium fluctuates. One or more ends of the fiber may extend through the walls of the containment chamber to facilitate optically coupling the fiber to other components (e.g., pump lasers, fiber amplifiers and the like). The containment chamber is formed from a material which is resistant to the diffusion of deuterium gas, including, without limitation, metals, glass, ceramics, composites and/or polymers.

In the embodiments of the single-clad and double-clad optical fiber lasing media described herein, the optical fibers are formed without gratings. Accordingly, it should be understood that the refractive index profile of the optical fiber lasing media is substantially uniform along an axial length of the optical fiber. However, it should be understood that optical fiber lasing media resistant to photodarkening and including gratings may be formed utilizing the same techniques described herein.

In some embodiments (not shown) of the single-clad and double-clad optical fiber lasing media, the first cladding portion may further comprise stress applying parts, such as glass rods having various cross-sectional configurations and compositions, which extend axially along the length of the optical fiber lasing media in the first cladding portion. In other embodiments (not shown), air holes may be formed in the first cladding portion and extend axially along the length of the optical fiber. In still other embodiments (not shown), the first cladding portion may additionally comprise both stress applying parts and air holes. Fiber with stress applying parts, air holes and various combinations of stress applying parts and airholes are described in U.S. patent application Ser. No. 11/437,382, filed May 19, 2006, entitled "METHOD OF MAKING OPTICAL FIBER", the entirety of which is incorporated by reference herein, and U.S. patent application Ser. No. 12/221,015 filed Jul. 30, 2008, entitled "POLARIZATION MAINTAINING AND SINGLE POLARIZATION OPTICAL FIBER", the entirety of which is incorporated by reference herein. The stress applying parts and air holes, used singularly or in combination, introduce stress into the optical fiber and form birefringence, enhancing the polarization maintaining properties of the fiber. Use of air holes in the first cladding portion also reduces the refractive index of one of the fundamental polarization modes of the fiber thereby enabling the fiber to be single polarization fiber. Accordingly, it should be understood that the optical fibers described herein may be a polarization maintaining fiber and/or a single polarization fiber.

As noted hereinabove, the optical fiber lasing media described herein are formed such that the concentration of defect color centers is low, preferably less than $1 \times 10^{18}/cm^3$. In order to achieve this low concentration of defect color centers, the optical fiber lasing media are produced by an outside-vapor-deposition (OVD) process. The OVD process is a way of making optical fiber through reactions from specific vapor ingredients (including silica and other dopant precursors) via a hydrolysis process in a $CH_4+O_2$ flame to form the silica glass and/or silica glass and dopant soot-particles, which are then collected onto either a bait rod (for making a core soot-preform) or a glass core cane or rod (for making overclad soot-preform). The soot-preform is subsequently dried and densified into solid transparent glass in a high temperature furnace (after the bait rod is removed from the core preform), a process commonly referred to as consolidation. The desired core and cladding compositions are achieved by utilizing different amounts of various vapor-ingredients for each of the layers in the soot preform fabrication process. In summary, the core and/or cladding preform is generated first, then consolidated, and the final (consolidated) preform is drawn into optical fiber by known fiber-drawing methods.

More specifically, vapor-precursor materials that may be used to make the portion of the soot preform associated with the core of the optical fiber lasing media (i.e., the core preform portion) are, in one embodiment, $SiCl_4$, $GeCl_4$, $AlCl_3$, $Yb(fod)_3$. In one embodiment, $POCl_3$ may be included among the vapor-precursor materials used to make the core preform portion of the optical fiber lasing media. The vapor-precursor materials are mixed with flowing $O_2$ and $CH_4$ and hydrolyzed in a flame to create glass soot particles having the desired composition. The temperature of the hydrolysis operation is approximately 1500° C. The glass soot particles are collected onto a bait rod to form a core soot preform on the bait rod.

The bait rod is removed from the core soot preform portion and consolidated to form a core preform portion. The core soot perform is consolidated by drying the core soot preform is dried in flowing chlorine gas at a temperature from about 1000° C. to about 1100° C. and then heating the core soot preform to a temperature range from about 1450° C. to about 1550° C. in a consolidation oven to produce a core preform portion of fully dense silica-based glass having the desired composition.

In the embodiments described herein, a core preform portion with a concentration of defect color centers is produced by maintaining the temperature of the glass during the hydrolysis and consolidation operations at less than 1600° C. and, more preferably, in a range from about 1500° C. to about 1600° C., and even more preferably, at about 1500° C.

After the soot is consolidated into the core preform portion, the OVD process is used to deposit $SiO_2$ soot on the consolidated core preform portion to form a soot preform of the first cladding preform portion. As described above, the first cladding portion may contain dopants which may raise or lower the index of refraction of the first cladding portion. Such dopants may be deposited with the $SiO_2$ soot. For example, when the first cladding portion is up-doped with $GeO_2$, the $GeO_2$ may be deposited with the $SiO_2$ soot.

In one embodiment, after the soot preform of the first cladding portion is deposited on the core preform portion, the soot forming the first cladding portion may be consolidated to form a first cladding preform portion on the core preform portion. Alternatively, in embodiments where the optical fiber lasing media is formed with a second cladding portion, a soot preform of the second cladding portion is formed over the soot preform of the first cladding portion before any further consolidation takes place.

In embodiments where the optical fiber lasing media is formed with a second cladding portion, the soot preform of the second cladding portion is deposited onto the first cladding preform portion. In one embodiment, as discussed above, the second cladding portion comprises silica glass down-doped with fluorine and boron in the form of $B_2O_3$. Accordingly, to deposit the down-doped silica glass layer, $SiO_2$ down doped with $B_2O_3$ is deposited on the first cladding preform portion (either consolidated or un-consolidated) to form a soot preform of the second cladding portion. A gas containing F, for example $SiF_4$, is used in the subsequent consolidation process to lower the refractive index of the second cladding portion of the preform. As discussed above, the consolidated glass containing B and F has lower refractive index than pure silica.

More specifically, boron/fluorine codoping in silica glass is accomplished via two steps: (i) boron doping in soot laydown; followed by (ii) silica sinter-doping during consolidation. For example, laydown of boron-doped $SiO_2$ may be accomplished using $BCl_3$ and $SiCl_4$ or B- and Si-containing organometallic precursors as source materials. It is noted that the capture efficiency of boron in laydown increases as OVD burner flame temperature decreases. The preferred temperature range during the laydown step is about 1400° C. to 1600° C. to achieve a boron oxide density of 10 wt.% to 12 wt.% and suitable soot density (for example less than 0.6 gm/$cm^3$, more preferably less than 0.5 gm/$cm^3$, and even more preferably less than 0.4 gm/$cm^3$) for easier F sinter-doping at the subsequent consolidation step. Such a boron-doped soot made preform usually has high OH content and high stress level, due respectively to the lower temperature hydrolysis process and higher thermal expansion coefficient of the soot composition. To prevent the likelihood of the soot preform from cracking, a thermal stabilization step is preferred for the soot preform prior to its F-sinter doping at consolidation. The soot preform is preferably thermally stabilized at 100° C. to 500° C., for example in a 300° C. holding oven under a dry inert gas atmosphere for about 8 hours. In this regard, thermal stabilization may be 3 to 24 hours (e.g., 10, 12, 16, or 18 hours), with longer thermal stabilization for larger size soot preforms.

The soot preform according to this exemplary embodiment is then consolidated in a furnace with a fluorine compound, for example with $SiF_4$ or $CF_4$. Fluorine (F) sinter-doping into the boron-containing soot-preform, is a single-zone consolidation process. The entire consolidation process occurs in the lower temperature furnace's drying zone region, which is usually situated in the upper part of the standard consolidation furnace. Consolidation is done at relatively low temperatures due to the rather low glass-transition temperature ($T_g$) of the B/F co-doped silica (which is around 800° C., or lower). The exemplary silica soot preform (doped with 9 wt.% B) is first $Cl_2$-dried at around 850° C.-900° C. for 45-60 minutes. The dry-zone temperature is then ramped-up to 1200° C. for sinter/F doping for 90 to 150 minutes with $SiF_4$. During sintering and F doping, the boron composition of the consolidated glass drops significantly, such as from 10 wt. % in the soot phase to 4-8 wt. % in the fully consolidated glass phase. Such a reduction is caused by etch out of boron in the presence of fluorine. As a result, the boron and fluorine concentration in the consolidated glass may be in the range of 4-8 wt % and 1.5-3 wt %, respectively.

In embodiments where the first cladding portion of the optical fiber lasing media is non-circular, such as when the first cladding portion is hexagonal in cross section, the preform may be machined after consolidation to achieve the desired geometry. For example, when optical fiber lasing media is desired with a first cladding portion having a hexagonal cross section, the soot preform of the first cladding portion is initially formed with a circular cross section. However, after the soot preform of the first cladding portion is consolidated, the consolidated preform is machined to achieve the desired hexagonal geometry. Similar techniques may be utilized to form first cladding preform portions of different geometries or to shape the core preform portions and/or second cladding preform portions to the desired geometrical configuration.

Following consolidation, the optical fiber preform is cooled. Thereafter, the optical fiber preform is positioned in an optical fiber draw furnace and heated to a temperature in the range from about 1900° C. to about 2100° C. to facilitate drawing the preform into optical fiber which is cooled and wound on to storage spools. The storage spools are then placed in a soaking chamber comprising a gaseous atmosphere having at least 2% deuterium gas, more preferably from about 2% deuterium gas to about 6% deuterium gas. In one embodiment, the remainder of the gaseous atmosphere comprises helium or a similarly inert gas. The optical fiber is heated in the soaking chamber to a temperature of at least 35° C. for at least 48 hours to allow the deuterium gas to diffuse into the core portion of the optical fiber and react with the defect color centers to form reacted defect color centers.

Thereafter, the optical fiber may be cut into lengths and hermetically sealed in a containment chamber comprising deuterium gas, as described above.

Figure 5:
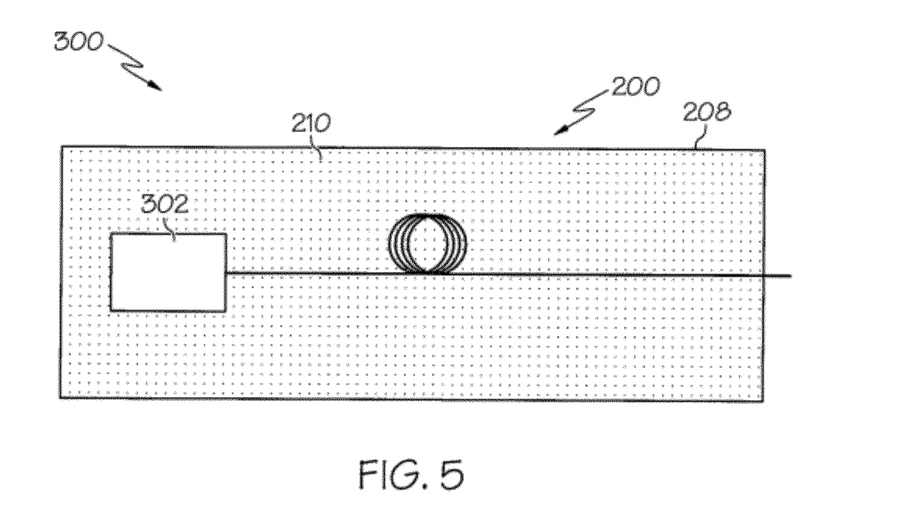
FIG. 5 schematically depicts a fiber laser system comprising an optical fiber lasing medium positioned in a containment chamber filled with deuterium gas and a pump laser optically coupled to the fiber lasing medium, according to one or more embodiments shown and described herein.

Referring now to FIG. 5, one embodiment of a fiber laser system 300 is schematically depicted. The fiber laser system 300 may generally comprises an optical fiber lasing medium, such as the double-clad optical fiber lasing medium 200 described above. The optical fiber lasing medium 200 is disposed in a containment chamber 208 which is filled with deuterium gas 210. A lasing cavity may be formed by positioning two optical mirrors (not shown in FIG. 5) at opposite ends of the fiber lasing medium 200. The optical mirrors provide optical feedback at the lasing wavelength of the fiber lasing medium 200. In the embodiment shown in FIG. 5, all the components of the laser system, including the pump laser 302 is positioned in the containment chamber 208. However, in other embodiments, fewer than all the components of the optical fiber lasing systems may be positioned in the chamber. For example, in one embodiment, only the optical fiber lasing media is positioned in the containment chamber.

In another embodiment (not shown), the fiber laser system may be a master oscillator power amplifier (MOPA) which comprises a pump laser, a seed laser (not depicted) and a wavelength-division multiplexer (WDM), such as a dichroic mirror. The seed laser generates light with a wavelength within the gain bandwidth of the optical fiber lasing medium. The WDM is used to combine the seed light generated by the seed laser and the pump light generated by the pump laser and couple the combined light into the optical fiber lasing medium.

The pump laser 302 is capable of producing a pump beam for optically pumping the optical fiber lasing medium 200. In the embodiments described herein, the pump laser is capable of producing an infrared pump beam. For example, in one embodiment, the pump beam has a wavelength in the range from about 900 nm to about 980 nm. In some embodiments, the wavelength of the pump beam is 915 nm, 940 nm, or 976 nm In the embodiments where the optical fiber lasing medium 200 comprises a double-clad optical fiber as shown in FIG. 5, the pump beam is optically coupled to the first cladding portion of the optical fiber lasing medium 200. However, in embodiments where the optical fiber lasing media comprises a single clad optical fiber, the pump beam is optically coupled to the core portion of the optical fiber lasing medium.

As noted herein, the core portion of the optical fiber lasing medium does not absorb ultraviolet and visible wavelengths of light. The reacted defect color centers in the core portion of the optical fiber lasing medium absorb wavelengths of light greater than 1250 nm Both properties are attributable to the low concentration of defect color centers during formation of the optical fiber and the formation of reacted defect color centers by the addition of deuterium. Moreover, the optical fiber lasing media described herein are resistant to photodarkening and, as such, the output intensity of the lasing media does not diminish over extended periods of lasing operation. For example, in the embodiments described herein, the core portion of the optical fiber lasing media has an induced core absorption of less than 5 dB/m at a wavelength of 635 nm after exposure to a pump beam having a power density of greater than $1 \times 10^{10}$ W/$m^2$ for 1500 hours. Further, the output power of an output beam emitted from the optical fiber lasing media (single-clad or double-clad) decreases by less than 20% after at least 1500 hours of lasing operation. In some embodiments, the decrease in optical power of the output beam of the lasing medium after 1500 hours of lasing operation is less than 15%, less than 10%, or even less than 5%.

EXAMPLES

A system for measuring the output power of a fiber laser system was utilized in each of the following examples. The system was constructed as a MOPA which comprised a pulse oscillator, a fiber stretcher, two stages of single-mode, Yb-doped fiber pre-amplifiers, and a power fiber amplifier. The test fiber in each example was used as the gain fiber of the power amplifier. The pulse oscillator was a passively mode-locked, Yb-doped fiber laser capable of generating 3 ps laser pulses at a frequency of 29.5 MHz. The spectral center of each pulse was 1052 nm and a spectral width of each pulse was 0.5 nm. The output pulses of the oscillator were first stretched to approximately 90 ps by using a piece of 1.74 km standard single-mode fiber. Then, the pulses were launched into the first Yb-doped fiber preamplifier. A chirped fiber grating with a center wavelength of 1052.6 and a 3 dB spectral bandwidth of 3.9 nm was inserted between the first and second fiber pre-amplifiers to filter the amplifier spontaneous emission. The pulses output from the second fiber preamplifier had an average power of about 200 mW, and the spectral width of the pulses was broadened to approximately 3 nm mainly due to self-phase modulation in the stretcher fiber. Finally, the pulses were launched into the power amplifier in which the fiber under test was utilized as the gain fiber. The test power level of the test fiber was controlled by the pump power of the power amplifier. Three test fibers were measured.

Comparative Example 1

Figure 6:
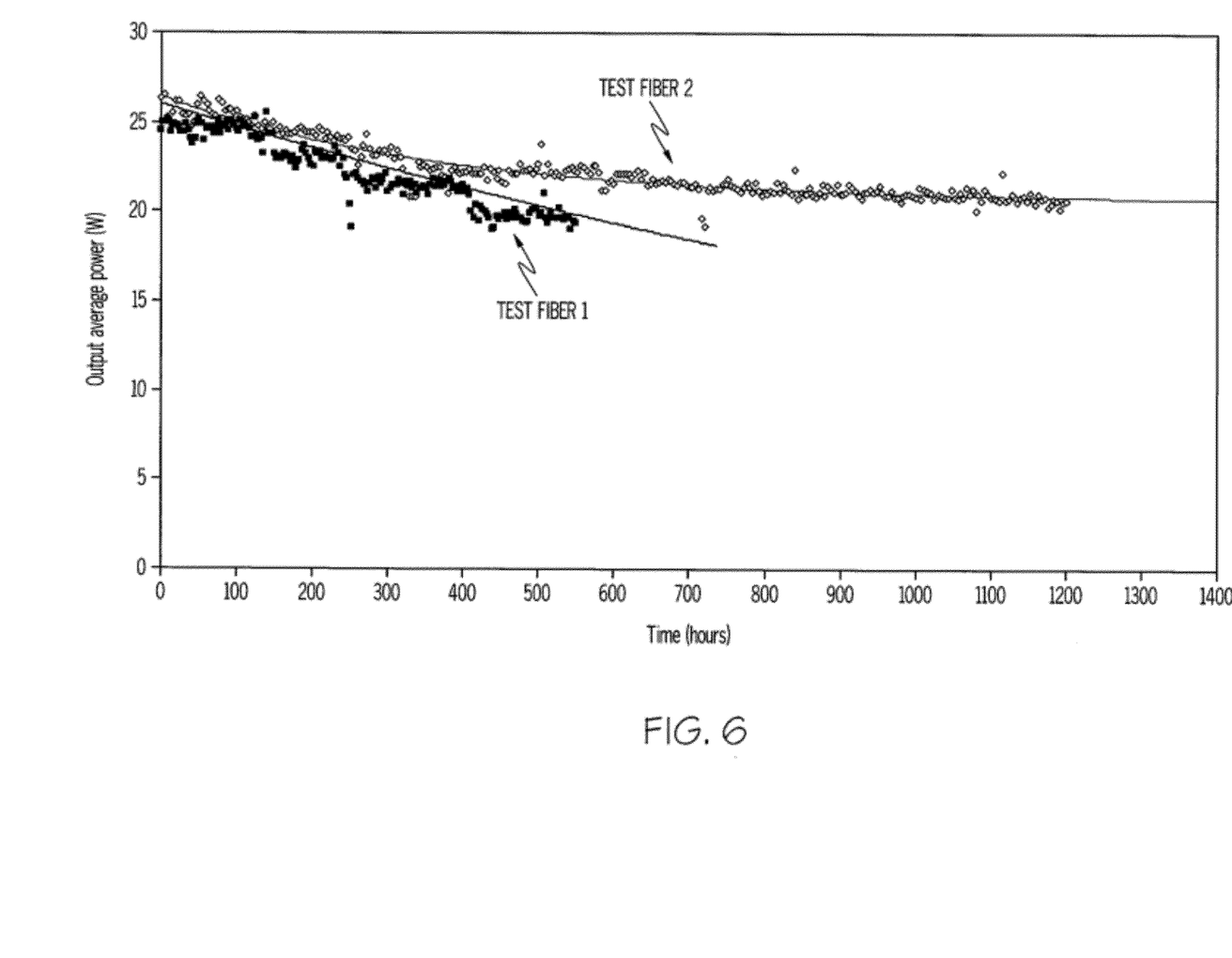
FIG. 6 graphically depicts a plot of laser operation time (x-axis) versus average output power (y-axis) for two comparative examples a laser system comprising a double clad optical fiber lasing medium.

The first test fiber was a polarization-maintaining (PM), Yb-doped double-clad fiber made by modified chemical vapor deposition (MCVD) processing (i.e., a deposition process in which consolidation temperatures exceed 2000° C.). The core and inner clad diameters of the fiber were 25 μm and 250 μm respectively. The average output power of the power amplifier was set at 25 W, which corresponded to a peak power of 9.4 kW. The average output power of the power amplifier in which the first test fiber was tested is graphically illustrated in FIG. 6 as a function of time. As shown in FIG. 6, the average output power of the power amplifier utilizing the first test fiber was reduced by about 20% after about 550 hours of operation. A mathematical model based on this data predicted that, after a 1923 hour test, the power of the first test fiber would drop to about 1.22 W.

Comparative Example 2

The second test fiber was a piece of PM, Yb-doped double clad fiber which was made by the OVD processing described herein such that the fiber has a low concentration of defect color centers. The second test fiber had a core diameter of 25 μm and an inner cladding diameter of 300 μm. The second test fiber was not subjected to a deuterium treatment. Test fiber 2 was tested under the same test conditions as the fiber in Comparative Example 1. The average output power of the power amplifier decreased by about 20% after 1200 hours of testing, as shown in FIG. 6, indicting that, compared to the MCVD-processed test fiber (i.e., test fiber 1), the second test fiber had improved resistance to photodarkening due to the relatively lower defect concentration compared to the first test fiber which had a defect concentration as much as 4-5 orders of magnitude greater than the defect concentration in second test fiber. However, test fiber 2 still demonstrated a decrease in power due to photodarkening after extended lasing operation.

Example 1

Figure 7:
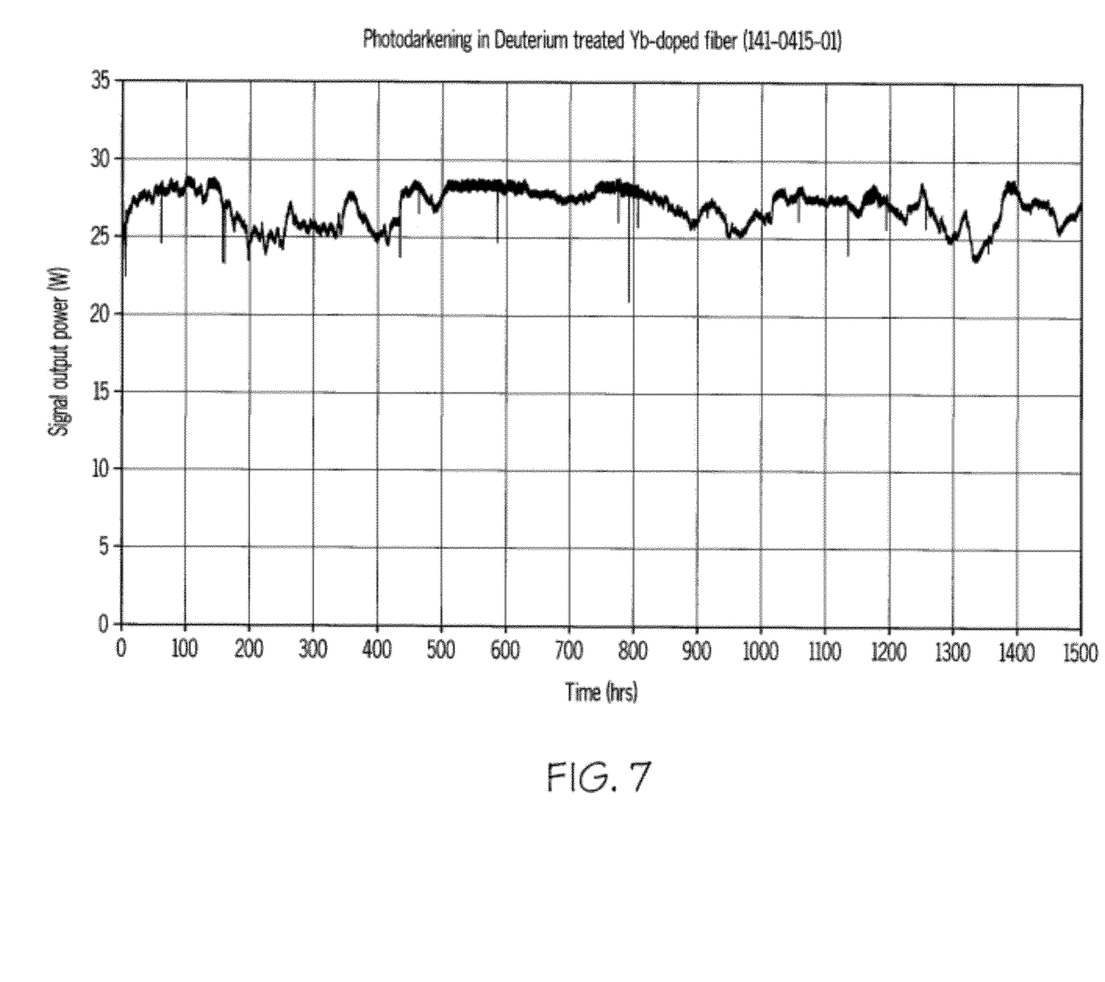
FIG. 7 graphically depicts a plot of laser operation time (x-axis) versus average output power (y-axis) for a laser system comprising a double clad optical fiber lasing medium according to one or more embodiments shown and described herein.

The third test fiber was a piece of PM, Yb-doped double clad fiber which was made by the OVD processing described herein such that the fiber has a low concentration of defect color centers. The second test fiber had a core diameter of 25 μm and an inner cladding diameter of 300 μm inner clad. The third test fiber was loaded with deuterium by chambering the test fiber with a mixture of 2% deuterium in helium at a temperature of 35° C. for 48 hours. The third test fiber was tested under the same test conditions as the fibers in Comparative Examples 1 and 2. The output power of the power amplifier in which the third test fiber was tested is graphically depicted in FIG. 7 as a function of time. As shown in FIG. 7, the average output power of the power amplifier was greater than 25 Watts and, although the output power fluctuates due to drifts in the pump power during the experiments, the output power of the third test fiber was not diminished after 1500 hours of operation.

The fluctuations in the output power of the power amplifier in each of Comparative Examples 1 and 2 and Example 1 are attributed to drifts in the pump power and drifts in alignments of the fibers.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber lasing medium comprising:
a core portion formed from silica-based glass comprising a rare-earth dopant and deuterium, the core portion having an index of refraction $n_c$, a numerical aperture $NA_c$, and a concentration of defect color centers of less than $1 \times 10^{16}/cm^3$, wherein the deuterium is combined with the defect color centers to form reacted defect color centers and the reacted defect color centers do not absorb ultraviolet and visible wavelengths of light; and
a first cladding portion formed from silica-based glass, the first cladding portion surrounding and directly contacting the core portion and having an index of refraction $n_1$, wherein the index of refraction $n_1$ of the first cladding portion is less than the index of refraction $n_c$ of the core portion.

2. The optical fiber lasing medium of claim 1, wherein the reacted defect color centers in the core portion absorb wavelengths of light greater than about 1250 nm.

3. The optical fiber lasing medium of claim 1, wherein a concentration of deuterium in the core portion is at least about $1 \times 10^{18}$ molecules/$cm^3$.

4. The optical fiber lasing medium of claim 1, wherein an induced core absorption of the core portion is less than 5 dB/m at an input wavelength of 635 nm after exposure to a pump beam with a power density of greater than $1 \times 10^{10}$ W/$m^2$ for 1500 hours.

5. The optical fiber lasing medium of claim 1, wherein the core portion further comprises:
from about 0 wt. % to about 10 wt. % $GeO_2$;
from about 0.05 wt. % to about 1.5 wt. % of the rare-earth dopant;
from about 0 wt. % to about 10 wt. % phosphorous; and
from about 3 wt. % to about 10 wt. % aluminum.

6. The optical fiber lasing medium of claim 1, wherein the rare-earth dopant is selected from the group consisting of Yb, Er, Nd, Tm, Sm, Gd, Pr, and Tb.

7. The optical fiber lasing medium of claim 1, wherein the numerical aperture $NA_c$ of the core portion is less than 0.4.

8. The optical fiber lasing medium of claim 7, wherein the first cladding portion comprises silica-based glass comprising less than about 5 wt. % $GeO_2$.

9. The optical fiber lasing medium of claim 7, wherein:
the core portion has a diameter in a range from about 3 microns to about 15 microns; and
the first cladding portion has a maximum diameter $D_1$ in a range from about 100 microns to about 250 microns.

10. The optical fiber lasing medium of claim 1, further comprising a second cladding portion surrounding and directly contacting the first cladding portion and having an index of refraction $n_2$, wherein the index of refraction $n_2$ of the second cladding portion is less than the index of refraction $n_1$ of the first cladding portion;
the first cladding portion comprises silica-based glass comprising from about 5 wt. % to about 12 wt. % $GeO_2$.
the numerical aperture $NA_c$ of the core portion is less than 0.08; and
a numerical aperture $NA_1$ of the first cladding portion is at least 0.3.

11. The optical fiber lasing medium of claim 10, wherein the core portion has a diameter in a range from about 10 microns to about 50 microns.

12. The optical fiber lasing medium of claim 10, wherein the second cladding portion comprises silica-based glass with from about 5 wt. % to about 9 wt. % boron and from about 1.5 wt. % to about 3 wt. % fluorine.

13. The optical fiber lasing medium of claim 10, wherein the first cladding portion has a maximum diameter $D_1$ in a range from about 200 microns to about 850 microns.

14. The optical fiber lasing medium of claim 10, wherein the second cladding portion has a maximum diameter $D_2$ in a range from about 300 microns to about 1000 microns.

15. The optical fiber lasing medium of claim 1, further comprising a containment chamber positioned around and spaced apart from at least a portion of the first cladding portion, wherein the optical fiber lasing medium is sealed within the containment chamber and the containment chamber is filled with a gaseous atmosphere comprising deuterium.

16. A fiber laser system comprising:
a pump laser;
an optical fiber lasing medium optically coupled to the pump laser, the optical fiber lasing medium comprising:
a core portion formed from silica-based glass comprising a rare-earth dopant and deuterium, the core portion having an index of refraction $n_c$, a numerical aperture $NA_c$, and a concentration of defect color centers of less than $1 \times 10^{16}/cm^3$, wherein the deuterium is combined with the defect color centers to form reacted defect color centers and the reacted defect color centers do not absorb ultraviolet and visible wavelengths of light; and
a first cladding portion formed from silica-based glass, the first cladding portion surrounding and directly contacting the core portion and having an index of refraction $n_1$, wherein the index of refraction $n_1$ of the first cladding portion is less than the index of refraction $n_c$ of the core portion; and
a containment chamber positioned around and spaced apart from at least a portion of the first cladding portion, wherein the optical fiber lasing medium is sealed in the containment chamber and the containment chamber is filled with a gaseous atmosphere comprising deuterium.

17. The fiber laser system of claim 16, wherein an output power of an output beam emitted from the optical fiber lasing medium decreases by less than 20% after at least 1500 hours of operation of the fiber laser system.

18. The fiber laser system of claim 16, wherein the pump laser is positioned within the containment chamber.

19. A method for manufacturing optical fiber lasing media, the method comprising:
forming a core preform portion of an optical fiber preform such that the core preform portion comprises an active rare earth dopant;
forming a first cladding preform portion of the optical fiber preform such that the first cladding preform portion is positioned around and in direct contact with the core preform portion;
consolidating the optical fiber preform such that an optical fiber drawn from the optical fiber preform has a concentration of defect color centers of less than $1 \times 10^{16}/cm^3$;
drawing the optical fiber preform into an optical fiber; and
positioning the optical fiber in a soaking chamber having a gaseous atmosphere comprising helium and deuterium gas, wherein the deuterium gas reacts with the defect color centers to form reacted defect color centers that do not absorb ultraviolet and visible wavelengths of light.

20. The method of claim 19, wherein:
the core preform portion is formed by outside vapor deposition; and
the gaseous atmosphere in the soaking chamber comprises at least about 2% deuterium gas; and
the optical fiber is heated in the soaking chamber to a temperature of at least 35° C. for at least 48 hours.

* * * * *